June 30, 1942. D. S. McKITTRICK ET AL Re. 22,126
SEPARATION OF PHASES WITH THE AID OF SONIC WAVES
Original Filed April 9, 1940
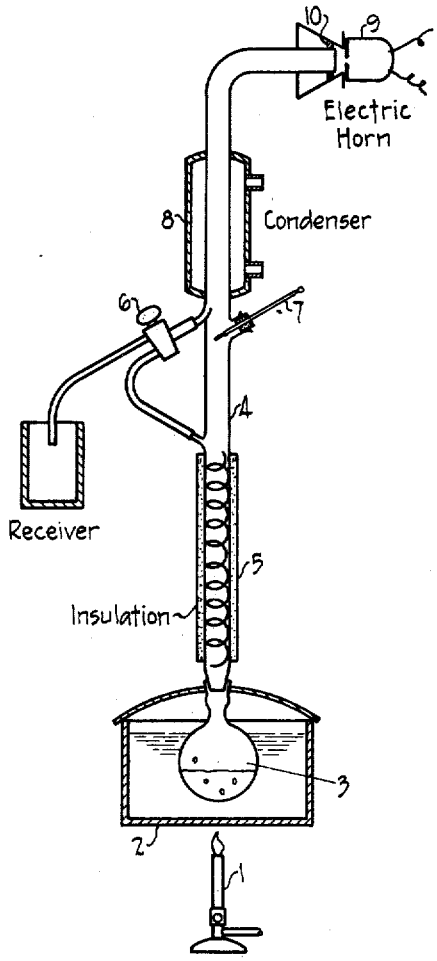
Inventors: Donald S. McKittrick
Robert E. Cornish
By their Attorney: E. W. Rubin Reissued June 30, 1942

Re. 22,126

UNITED STATES PATENT OFFICE 22,126

SEPARATION OF PHASES WITH THE AID OF SONIC WAVES

Donald S. McKittrick, Oakland, and Robert E. Cornish, Berkeley, Calif., assignors to Shell Development Company, San Francisco, Calif., a corporation of Delaware Original No. 2,265,762, dated December 9, 1941, Serial No. 328,756, April 9, 1940. Application for reissue January 26, 1942, Serial No. 428,268

2 Claims. (Cl. 202—39)

This invention relates to an improvement in the fractionation of mixtures capable of being separated by physical means. More particularly it relates to processes of fractionation in which liquids come in contact with vapors or gases, as in stripping, rectifying, and general distillation processes, or to processes in which liquids come in contact with other liquids, as is the case in liquid-liquid extraction.

Distillation, stripping and rectifying, etc., are normally carried out in plate columns or packed towers. During these operations, one or several liquids flow downward over the plates or the packing, as the case may be, in the form of a more or less continuous or a coarsely dispersed stream, while the vapors flow upward in countercurrent to this stream. The descending stream of liquid may be broken up or be dispersed by the ascending vapors to various degrees, depending on several factors such as the design of the plates or of the packing, velocities of the liquids and/or the vapors, presence of two or more liquids forming separate phases as in azeotropic distillation, etc. The predominating portion of this liquid stream is, however, never broken up to a fine dispersion, such as a fog, which fails to coalesce and is carried along by the vapors, but at all times remains in the form of a substantially continuous phase or of an unstable dispersion sufficiently coarse so that it will revert to a continuous phase immediately upon the elimination of the dispersing factors, and will, in any case, continue in its proper direction of flow. For convenience, we call this state a substantially continuous or readily coalescible dispersed liquid phase.

It is understood that in liquid-liquid extraction similar substantially continuous or coalescibly dispersed liquid phases occur.

An object of the invention is to improve the general efficiency of such processes. A further object is to attain this end by subjecting such fractionation zones in which a substantially continuous or coalescibly dispersed liquid phase is in contact with another fluid phase to the influence of sonic waves, which may be within, above, or below the audible range of frequencies.

The improvement consists in subjecting a zone of liquid-vapor, liquid gas, or liquid-liquid contact to vibrations set up in it by the influence of sonic waves. By sonic waves is meant those waves of alternate compression and rarefaction through an elastic body such as, for example, ordinary sound waves, or ultrasonic or supersonic waves having higher frequencies than sound waves but preferably not above about 500 megacycles per second. Thus the sonic waves, the use of which is contemplated in this invention, covers a band of about 50 cycles per second to 500 megacycles per second. It has been discovered that the vibrations set up by such waves increase the rate of interchange of components between the liquid and another fluid phase, thus accelerating the rate of attainment of equilibrium between the phases. The effect of this phenomenon is improved efficiency and may be explained by the assumption that the sonic waves increase the fluid movement of at least one of the fluid phases without a corresponding increase in fluid velocity and so of throughput through the apparatus, thus reducing the height that is equivalent to a theoretical plate. Therefore, by virtue of this improved efficiency, rectification columns, enriching columns, stripping columns, extraction units, etc., can be built of smaller size, for a given capacity, and therefore at less expense.

It must be understood that the frequencies of the vibration employed will vary with the end in view, and that, in general, the efficiency is increased most when the natural period of the vibration of the zone of contact is such that it is in a state of resonance with respect to the frequency of the sonic waves causing the vibration. One advantage of resonance is that in that state much larger amplitudes of waves are obtainable with a given amount of energy than when the system is not in resonance. That is, for a given amount of energy input available, stronger sound waves are produced if the system is in resonance, hence greater reduction in the height equivalent to a theoretical plate would be expected.

As a general rule, it is preferable to use frequencies above the lower limit of the audible range. The low frequency vibrations, e. g., from 50 cycles/sec. on down, are particularly subject to damping and therefore not practical to use. It is also preferable to use frequencies well below the upper limit of the sonic range (500 megacycles per second) since at frequencies above 5 megacycles per second a large portion of the energy supplied is dissipated as heat and, further, may cause emulsion difficulties.

Because of the disadvantages of the noise when employing audible frequencies (up to 16,000 cycles/sec.) it is sometimes desirable to use ultrasonic waves, i. e., non-audible waves of high frequencies. Another advantage of using these high frequency waves is that they are thought to be less subject to damping by the liquid present than are the waves of lower frequencies, at least as far as damping from heat conduction and viscosity effects is concerned.

It is understood that there are many possible ways of introduction of the sonic waves. It is not in all cases desirable that the whole fractionation zone or column be subject to vibration. For example, in a still it may be more desirable to place sonic wave generators on or between individual bubble plates, or even upon individual bubble caps. In the case of packed columns, it is sometimes desirable to mount wave generators upon the walls or upon supports within the packed zone of the tower. Special sonic wave passages may be built into the distillation zone, and it may be more advantageous to have one major sonic wave source with a distributing system for conveying the waves to the desired parts of the apparatus, or sometimes to have individual sonic wave generators which will create the sonic waves upon the desired site of application. One of the reasons for supplying sound at several parts of the column (either by use of several generators or by the distributing system above referred to) is that there may be considerable damping of the sound waves. In some experimental distillations with glass fractionating columns, it might be seen that there was rather violent agitation of the liquid phase, with fine drops thrown into the vapor phase, at and near the point of entrance of the sound waves into the packed fractionating column, while at the opposite end of the fractionating column the liquid phase was seen to be comparatively undisturbed. In such a column, it is obviously desirable to introduce the sound waves in such a manner as to produce considerable vibration of the gas phase at all parts of the column, instead of only at one end. This may be done by either of the two methods above disclosed, or the entire shell of the column may be made to vibrate, thus transmitting the vibrations to the gas and liquid phases therein contained.

It is also sometimes desirable, when using a series of vibration generators, to have them tuned to different frequencies along the length of the column. Since different parts of the column may have different resonant frequencies, for example, if it is desired to have various parts of the column interior vibrating at the resonant frequencies of the respective parts, the necessity for various frequencies is evident.

Any type of sonic generator may be employed for this purpose, such as the mechanical generators like the Galton Whistle, the Gas Current generator, and Holtzmann's generator, the so-called thermal generators, the magneto-striction generators, and the piezo electric generators. Also the common devices for generating sonic waves predominantly within the audible range of frequencies, such as the common mechanical or electrical horns, sirens, whistles, tappers, etc.

The fractionating effect may vary with the input of energy, in general better efficiency being obtained with relatively large energy inputs. One skilled in the arts of distillation and sound generation may readily select sound generators of sufficient power to produce substantial increase in fractionating efficiency.

One embodiment of an apparatus useful for carrying out a fractionation according to the present invention is illustrated in the accompanying drawing which represents in side elevation a simplified apparatus for carrying out distillation under the influence of sonic waves in the audible range. A burner 1 supplies heat to an oil bath 2. In the oil bath a flask 3 is suspended and attached to it is an insulated column 4 equipped inside with a spiral wire helix 5. On the column is a thermometer 7 and a stop-cock 6. Above the column is a condenser 8, and a right-angle extension to which is attached a sonic generator, for example, an electric horn 9, of the 6 volt diaphragm interrupter type. The electric horn is tightly connected to the top of the condenser by a rubber gasket 10. This serves to largely confine the vibrations to the inside of the still, instead of allowing them to escape freely into the room. The double effect is therefore that the amount of sound inside the column is increased, and the objectionable noise in the outside room reduced.

It is understood that in the accompanying drawing only one of many possible applications of the present invention is illustrated. It is intended to be illustrative only, and the many other possible modifications within the scope of the invention will be apparent to one skilled in the art.

It is further understood that the process above described is also applicable to fractional liquid-liquid extraction and sublimation processes.

*Example*

A charge of 700 c. c. of 5 mol % carbon tetrachloride and 95 mol % benzol was charged to the apparatus described above. The insulated column was equipped inside with a spiral wire helix and at the top of the column was a cock to allow samples to be collected. A thermometer showed the temperature at the top of the column, while the condenser supplied the reflux. An electric automobile horn of the 6 volt diaphragm type, operated by a magnet and an interrupter, was attached to a right-angle extension of the column.

The results of the distillation are shown in the following table:

| Time | Column top temp. | Sound | Prop. of distillate | | Theoretical plates (5% basis) |
|---|---|---|---|---|---|
| | | | R. I. 20° C. | Mol. % $CCl_4$ | |
| | °C. | | | | |
| 3.54 | 79.60 | Off | 1.4976 | 9.3 | 3.0 |
| 4.10 | 79.24 | On | 1.4962 | 12.8 | 4.6 |
| 4.30 | 79.60 | Off | 1.4977 | 9.1 | 2.9 |

A sufficiently low rate of distillation was maintained to insure approximately constant kettle composition. The results indicate an increase of about 1.65 theoretical plates, as a result of sound waves. This is an increase of 55% in the number of theoretical plates in the column over what was observed without sound. The oil bath was held at 110° C. The still head temperature was read every 15 minutes. Samples of one or two cubic centimeters were withdrawn from the head of the column hourly and analyzed by measuring their refraction indices. The sound device was operated during alternate periods. Improvement in fractionation was evidenced by a decrease in temperature or refractive index.

Between the times when the samples were collected, the column was operated at total reflux. This simplified the computations of height equivalent to a theoretical plate. After collection of a sample for analysis, the column operated at least thirty minutes at total reflux, during which time stop-cock 6 was turned so that the liquid in the collecting cup ran back into the column as shown in the drawing. It was, therefore, justifiable to assume total reflux in the calculations, as explained below.

The calculations were all based on the assumption that the liquid in the kettle contained 5 mol % $CCl_4$. The mol fraction of the various samples was calculated from the refractive index assuming the plot of refraction index vs. mol fraction to be a straight line, and taking refractive indices 1.4697 for $CCl_4$ and 1.5014 for $C_6H_6$, these being determined at $n20/D$ for the individual substances before introduction to the flask. From the composition of the distillate at total reflux, the number of theoretical plates was read off from a plot of number of theoretical plates vs. composition (in mol fraction). This plot was constructed from the data of M. A. Rosanoff and E. W. Easley, "Journal of American Chemical Society", 31, 953–987 (1909), by the method of W. L. McCabe and E. W. Thiele, "Industrial and Engineering Chemistry," 17, 605–611 (1925).

We claim as our invention:

1. In a distillation process wherein ascending vapors contact liquid reflux in a reflux zone, the step of subjecting the overhead vapors in said zone to the direct influence of sonic vibrations of frequencies between 50 cycles per second and 5 megacycles per second, thereby increasing efficiency of fractionation in said zone.

2. The process of claim 1 wherein the sonic vibrations have such frequencies as to be in resonance with the natural frequencies of said reflux zone.

DONALD S. McKITTRICK.
ROBERT E. CORNISH.